United States Patent [19]

Watkins et al.

[11] Patent Number: 4,580,633

[45] Date of Patent: * Apr. 8, 1986

[54] INCREASING THE FLOW OF FLUIDS THROUGH A PERMEABLE FORMATION

[75] Inventors: David R. Watkins, Irvine; Leonard J. Kalfayan, Pasadena, both of Calif.

[73] Assignee: Union Oil Company of California, Los Angeles, Calif.

[*] Notice: The portion of the term of this patent subsequent to Feb. 12, 2002 has been disclaimed.

[21] Appl. No.: 564,237

[22] Filed: Dec. 21, 1983

[51] Int. Cl.$^4$ .................. E21B 43/22; E21B 43/24; E02D 3/12; C09K 17/00

[52] U.S. Cl. .................. 166/295; 166/272; 166/300; 166/303; 106/900; 252/8.55 R; 405/264

[58] Field of Search .......... 166/270, 272, 300, 294, 166/295, 303, 305 R; 405/264; 252/8.55 R; 106/900

[56] References Cited

U.S. PATENT DOCUMENTS

| | | | |
|---|---|---|---|
| 3,070,161 | 12/1962 | Kerver et al. | 166/294 X |
| 3,297,087 | 1/1967 | Spain | 166/295 |
| 3,476,189 | 11/1969 | Bezemer et al. | 166/295 |
| 3,565,176 | 2/1971 | Wittenwyler | 166/272 X |
| 3,822,749 | 7/1974 | Thigpen, Jr. | 166/303 |
| 4,156,463 | 5/1979 | Hall | 166/272 |
| 4,268,403 | 5/1981 | Buckman et al. | 166/303 X |
| 4,475,595 | 10/1984 | Watkins et al. | 166/303 |
| 4,476,930 | 10/1984 | Watanabe | 166/244 C X |
| 4,479,543 | 10/1984 | Kalfayan et al. | 166/300 |
| 4,498,538 | 2/1985 | Watkins et al. | 166/295 |

*Primary Examiner*—George A. Suchfield
*Attorney, Agent, or Firm*—Dean Sandford; Gregory F. Wirzbicki; Robert A. Franks

[57] ABSTRACT

Method for treating a formation, particularly one containing finely divided particulate material, to increase the flow of fluids through the formation wherein there is injected therein an organosilicon compound, preferably in a hydrocarbon carrier liquid, followed by injection of steam containing a compound which contains ammoniacal nitrogen, selected from the group consisting of ammonium hydroxide, ammonium salts of inorganic acids, ammonium salts of carboxylic acids, quaternary ammonium halides, amine or substituted amine hydrochlorides, derivatives of ammonium cyanate, and water-soluble ammonia or ammonium ion precursors selected from the group consisting of amides of carbamic acid and thiocarbamic acid, derivatives of such amides, tertiary carboxylic acid amides and their substituted and alkylated derivatives. A preferred nitrogen-containing compound is urea.

54 Claims, No Drawings

INCREASING THE FLOW OF FLUIDS THROUGH A PERMEABLE FORMATION

BACKGROUND OF THE INVENTION

1. Field of the Invention

This invention relates to a method for treating earthen formations, particularly those formations which contain clay, shale or other fines, to improve the flow of fluid through the formation. More particularly, the invention relates to such a method wherein the movement of fines and swelling of water-sensitive fines is minimized, any decrease in the permeability of the formation upon contact with water is minimized, the permeability is increased, and the viscosity of any oil in the formation is decreased.

2. Description of the Prior Art

Many earthen formations contain clays, shales, and/or fines, such as silt-sized or smaller particles. The formation can be exposed at the surface of the earth, e.g., roadbeds, hillsides and the like, or it can be a subterranean formation, including both those just below or near the surface, in which formations, footings or walls of structures rest, and those a substantial distance below the surface, from which oil, gas or other fluids can be produced.

When contacted by water, water-sensitive clays and shales, for example montmorillonite, can swell and decrease the permeability of the formation. Other non-clay fines often are free to move and tend to be carried along with a fluid flowing through the formation until they become lodged in pore throats, i.e., the smaller interstices between the grains of the formation. This at least partially plugs the openings and reduces the permeability of the formation. Thus, finely divided particulate matter can obstruct flow through a formation by swelling, migration or both.

When footings or foundations of buildings rest in formations containing such fines, damage or at least great inconvenience often stems from the inability of the earth to carry away water due to decreased permeability of the formation when wet. Likewise, drainage of formations surrounding septic tanks and underlying roadbeds is desirable.

One common instance in which fluids are produced from or injected into formations is in connection with the production of oil. Often it is desired to treat oil-bearing formations to increase the amount of oil recoverable therefrom. One popular method is to inject steam into the formation. The steam can be either dry or wet, i.e., it can contain a liquid water phase. In some instances steam is injected via a well, the well is then shut in temporarily and allowed to soak, and subsequently production is commenced from this same well. In other instances, steam is injected via one well and acts as a drive fluid to push oil through the formation to one or more offset wells through which the oil is produced. In either instance, when the steam reaches the subterranean formation, it at least partially condenses, thus exposing the formation rocks to fresh water. Even though the steam may act to mobilize the oil in the formation, if the formation contains fines and water-sensitive clays, the permeability of the formation can be reduced as a result of the contact of the fines by the fresh water, the increase in oil production can be lower than expected, and, in some instances, production can even be lower than before the treatment.

In another instance a fines-containing subterranean formation penetrated by a well may require stimulation because of water damage which occurred during drilling or fracturing operations.

Various treatments have been proposed to stabilize clays in a formation. Such treatments include injecting into the formation solutions containing such materials as potassium hydroxide, sodium silicate, hydroxy-aluminum, organic acid chrome complexes, organic polymers, and salts of a hydrous oxide-forming metal such as zirconium oxychloride. While each of these treatments has met with some success in particular applications, the need exists for a further improved method for treating a fines-containing formation to minimize the adverse affect of the fines on formation permeability, particularly when such a formation is contacted by a fluid containing water. Therefore, it is a principal object of this invention to provide a method for reducing the permeability damage in, and/or increasing the permeability of, formations containing finely divided particulate matter due to passage of a fluid therethrough.

It is another object to provide a method for inhibiting permeability impairment due to migration, transformation and/or swelling of very fine particles within a porous formation.

It is yet another object to stabilize a formation containing water-sensitive clays, shale and other fines.

It is yet another object to coat the fines of a fines-containing formation in the vicinity of the wellbore to bind them in position and to minimize contact between the fines and fluids subsequently passed through the formation.

It is a further object to provide such a method wherein steam is injected into the formation.

It is a still further object to provide a method for enhanced oil recovery from a formation containing hydrocarbons, especially viscous liquid hydrocarbons wherein steam is injected into the formation.

It is a still further object to stimulate a formation which has been damaged by water.

Other objects, advantages and features of this invention will become apparent to those skilled in the art from the following description and appended claims.

SUMMARY OF THE INVENTION

Briefly, the invention provides a method for treating or conditioning earthen formations, particularly those which contain finely divided particulate matter, such as water-sensitive clays and shale and/or other fines, which materials are free to move through the formation, transform and/or swell if contacted by an aqueous liquid, whereby the migration, transformation, and/or swelling of the fines is reduced so as to maintain a relatively high permeability through the formation and to increase the permeability of formations previously damaged. The method involves injecting into the formation:

(a) an organosilicon compound, such as organosilane halides, organosilane hydrides, organosilane alkoxides, and organosilane amines, including compounds containing more than one such functional group, such as organosilane halide alkoxide, in which an organosilane halide, hydride, or amine has the formula:

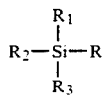

wherein R is a halogen, hydrogen, or an amine radical which can be substituted with hydrogen, organic radicals, or silyl groups, $R_1$ is hydrogen, an amine, or an organic radical having from 1 to 50 carbon atoms, and $R_2$ and $R_3$ are hydrogen or the same or different halogens, amines, or organic radicals having from 1 to 50 carbon atoms, and in which an organosilane alkoxide has the formula:

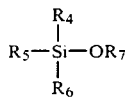

wherein $R_4$, $R_5$ and $R_6$ are independently selected from hydrogen, amine, halogen, alkoxide, and organic radicals having from 1 to 50 carbon atoms, privided not all of $R_4$, $R_5$ and $R_6$ are hydrogen and $R_7$ is an organic radical having from 1 to 50 carbon atoms, the organosilicon compound being preferably injected as a solution in a hydrocarbon carrier liquid and, optionally, with a polymerization catalyst selected from the group consisting of an organic or inorganic acid or acid precursor and an organic or inorganic base or base precursor, whereby the organosilicon compound reacts with siliceous surfaces which it contacts in the formation, coats the fines, binds them in place and restricts their subsequent movement; and (b) subsequently, a slug of steam, to which has been added, at some point prior to the time the steam contacts the formation, a compound containing ammoniacal nitrogen selected from the group consisting of ammonium hydroxide, ammonium salts of inorganic acids, ammonium salts of carboxylic acids, quaternary ammonium halides, amine or substituted amine hydrochlorides, derivatives of ammonium cyanate, and water-soluble ammonia or ammonium ion precursors selected from the group consisting of amides of carbamic acid and thiocarbamic acid, derivatives of such amides, tertiary carboxylic acid amides and their substituted and alkylated derivatives characterized by the formula:

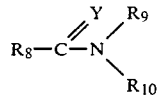

wherein (1) $R_8$ is hydrogen, or an organic radical, particularly an alkyl group containing 1 to about 8 carbon atoms, or an α-hydroxy substituted alkyl group containing 1 to about 8 carbon atoms, (2) $R_9$ and $R_{10}$ are independently selected from hydrogen and organic radicals, with alkyl groups containing 1 to about 8 carbon atoms being the preferred organic radicals, and (3) Y is oxygen or sulfur, whereby the formation fines, contacted by steam containing a compound which contains ammoniacal nitrogen (which fines are located some distance away from the wellbore and are not previously contacted by the organosilicon compound, are stabilized.

If the earthen formation is a subterranean formation, the treatment can be part of a method for enhanced oil recovery or a method for stimulating production from a formation penetrated by one or more wells.

DETAILED DESCRIPTION OF THE INVENTION

Most formations, regardless of their composition, contain at least some fines, detrital material or authigenic material which are not held in place by the natural cementatious material that binds the larger formation particles, but instead are loose in the formation or become dislodged from the formation when fluid is passed through the formation, as a result of rainfall, flow of ground water or during production of formation fluids via a well penetrating the formation or injection of fluids into the formation from the surface or via a well. The loose fines tend to become dispersed in the fluids passing through the formation and migrate along with the fluid. They are carried along and are either carried all the way through the formation and can be produced if the fluid is flowing to a well, or they can become lodged in the formation in constrictions or pore throats and thus reduce formation permeability. In addition, if the fines are clays or shale which swell in the presence of water and the fluid passing through the formation is or contains water, permeability reduction can occur due to swelled clay or shale particles occupying a greater proportion of the formation pore volume.

Formation fines can be incorporated into the formation as it is deposited over geologic time, or in the case of subterranean formations, can be introduced into the formation during drilling and completion operations. Fines are present to some extent in most sandstones, shales, limestones, dolomites and the like. Problems associated with the presence of fines are often most pronounced in sandstone-containing formations. "Formation fines" are defined as particles small enough to pass through the smallest mesh sieve commonly available (400 U.S. Mesh, or 37 micron openings). The composition of the fines can be widely varied, as there are many different materials present in subterranean formations. Broadly, fines may be classified as being quartz, other minerals such as feldspars, muscovite, calcite, dolomite and barite; water-swellable clays such as montmorillomite, beidellite, nontronite, saponite, hectorite and sauconite, with montmorillonite being the clay material most commonly encountered; non-water-swellable clays such as kaolinite and illite; shales; and amorphous materials.

In the broad sense a permeable formation is "treated" with a fluid by injecting therein the fluid which flows through the pores and contacts the formation rock. In treating a substantial volume of a formation, for example the drainage area of a subterranean oil-bearing formation penetrated by a well, the volume of fluid required to treat the entire formation can be quite large.

The combination treatment of this invention provides a method for improving the flow of fluids through a substantial volume of a formation. Treatment of the formation with a slug of an organosilicon compound is believed to coat the formation fines contacted, binding them in place and restricting their subsequent movement during passage of a fluid through the formation, thus primarily maintaining the permeability of the formation in the vicinity of the wellbore. Treatment with an organosilicon compound is primarily intended to stabilize permeability rather than increase it but, in some cases, it may also increase the permeability of the formation. It does little to affect the viscosity of any oil present in the formation. Injection of a slug of steam, containing a compound which contains ammoniacal nitrogen lowers the viscosity of oil in the formation rendering it more easily displaced and recovered. The ammoniacal nitrogen compound in the steam stabilizes fines rendering them less likely to reduce permeability when a water-containing fluid passes through the formation, and, in some instances, increases the permeability of the formation compared to what it was prior to the treatment, i.e., stimulates the formation. Thus, the combination of the two treatments, sequentially carried out, stabilizes or improves the permeability of a maximum volume of the formation, especially a fines-containing formation.

There is an advantage to treating with both types of material, in the sequence described herein, rather than treating with only one material. Used alone, an organosilicon compound is limited in formation coverage. As a pretreatment, an organosilicon compound penetrates the formation to a much ore shallow depth than that reached by steam. Further, vertical coverage of a producing interval will usually not be even: some zones can receive much of the treatment, while other zones receive little or no treatment. If, following treatment with an organosilicon compound, steam is injected, much of the formation will not have been protected. However, by adding ammoniacal nitrogen to the steam, the nitrogen, being present in both the liquid and vapor phases, will act to stabilize much of the formation against fines movement Although better coverage is obtained by ammoniacal nitrogen in the steam, organosilicon compounds provide superior fines stabilization in many formations, preventing permeability losses near the wellbore, which would normally be observed if ammoniacal nitrogen is used alone.

Among the organosilicon compounds suitable for use in this invention are organosilane halides, organosilane hydrides, and organosilane amines having the formula:

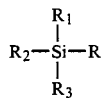

wherein R is a halogen, hydrogen, or an amine radical which can be substituted with hydrogen, organic radicals, or silyl groups, $R_1$ is hydrogen, an amine, or an organic radical having from 1 to 50 carbon atoms, and $R_2$ and $R_3$ are hydrogen or the same or different halogens, amines or organic radicals having from 1 to 50 carbon atoms. Preferably, R is a halogen selected from the group consisting of chlorine, bromine and iodine with chlorine being most preferred, $R_1$ is an alkyl, alkenyl or aryl group having from 1 to 18 carbon atoms and $R_2$ and $R_3$ are the same or different halogens, or alkyl, alkenyl or aryl group having from 1 to 18 carbon atoms.

Suitable specific organosilane halides include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Also suitable for use in this invention are organosilane alkoxides having the formula:

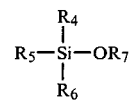

wherein $R_4$, $R_5$ and $R_6$ are independently selected from hydrogen, amine, halogen, alkoxide, and organic radicals having from 1 to 50 carbon atoms, provided not all of $R_4$, $R_5$ and $R_6$ are hydrogen, and $R_7$ is an organic radical having from 1 to 50 carbon atoms. Preferably, $R_4$, $R_5$ and $R_6$ are independently selected from hydrogen, amine, alkyl, alkenyl, aryl and carbohydroxyl groups having from 1 to 18 carbon atoms, with at least one of the $R_4$, $R_5$ and $R_6$ groups not being hydrogen, and $R_7$ is selected from amine, alkyl, alkenyl and aryl groups having from 1 to 18 carbon atoms. When $R_4$, $R_5$ and/or $R_6$ are carbohydroxyl groups, alkoxy groups are preferred.

Suitable organosilane alkoxides include divinyldimethoxysilane, divinyldi-$\beta$-methoxyethoxy silane, di($\nu$-glycidoxy propyl) dimethoxysilane, vinyltriethoxysilane, vinyltris-$\beta$-methoxyethoxysilane, $\nu$-glycidoxypropyltrimethoxysilane, $\nu$-methacryloxypropyltrimethoxysilane, $\beta$-(3,4-epoxycyclohexyl) ethyltrimethoxysilane, N-$\beta$-aminoethyl-$\nu$-propylmethyldimethoxysilane, N-$\beta$-aminoethyl-$\nu$-propyltrimethoxysilane, N-$\beta$-aminoethyl-$\nu$-aminopropyltrimethoxysilane, $\nu$-aminopropyltriethoxysilane, N-($\beta$-aminoethyl)-$\nu$-aminopropyltrimethoxysilane and the like. Preferred organosilane alkoxides include the amine-containing silanes, for example $\nu$-aminopropyltriethoxysilane. The presence of the amine function appears to result in a stronger adsorption of the silane on the formation rock. The resultant polymer renders the treated portion of the formation less oil wet than when a non-amine-containing silane is employed. Thus, in subsequent production of oil through the formation, less oil is retained by the formation and more of the oil is produced.

The amount of organosilicon compound which can be used varies widely depending on such factors as the characteristics of the particular compound employed, the nature, permeability, temperature and other characteristics of the subterranean formation and the like. Generally, the organosilicon compound is employed in an amount sufficient to maintain the rate of flow of liquid through the formation at a relatively constant rate following a treatment. Often, this is an amount sufficient to coat a substantial portion of the formation fines. Typically, about 0.5 to 100 gallons, per vertical foot of formation to be treated, of the organosilicon compound is employed.

The organosilicon compounds, hereinafter referred to as "silane material," can be injected either with or without a hydrocarbon carrier liquid. It is preferred to utilize a hydrocarbon carrier liquid since, with carrier-containing solutions, there is less opportunity for the silane material to contact water and at least partially react during its passage down the well conduit and through the formation in the immediate vicinity of the wellbore. The silane material either alone or mixed with a hydrocarbon carrier liquid passes readily through a permeable formation. However, reacted silane material tends to plate out on the face of the formation and penetrates the formation only to a limited extent. Suitable hydrocarbon carrier liquids include crude oil, aliphatic hydrocarbons such as hexane, aromatic hydrocarbons such as benzene or toluene, or petroleum distillation products or fractions such as kerosene, naphthas or diesel fuel. Preferably, solutions of about 0.2 to 50 percent by volume silane material in hydrocarbon carrier are employed.

While the reaction of the silane material with materials in the formation is not completely understood, and while the invention is not to be held to any particular theory of operation, it is believed that the silane material condenses on and reacts with active sites on siliceous surfaces with which it comes in contact to form a polymer. It is believed that the silane monomer first hydrolyzes and forms a reactive intermediate and either an acid or alcohol depending on the type of monomer:

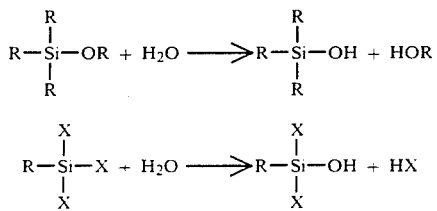

The reactive intermediates, "silanols," then condense to begin formation of the polymer.

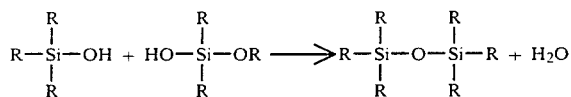

The growth of the polymer can proceed as hydrolysis and condensation continue.

The silanol can also react with active sites on the rock to covalently bind the polymer to it:

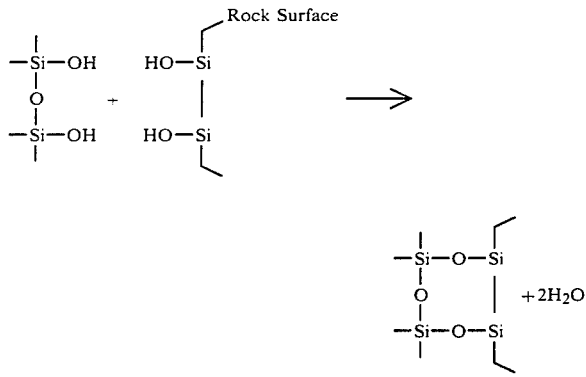

The polymer becomes covalently bonded to any siliceous surface, including clays and the quartz grains which define the pore structure in sandstones or poorly consolidated or unconsolidated formations containing siliceous materials. The polymer acts as a glue to bind formation fines in place, thus reducing their movement when a fluid flows through the formation. The polymer also coats any water-swellable clays and thereby reduces their subsequent swelling by water-containing fluids.

The rate of reaction of the injected silane material, with the siliceous materials in the formation, depends on various factors such as the organic substituents of the silane material, the concentration of silane material in the injected solution, the particular hydrocarbon carrier, if used, and the formation temperature. While the reaction of the silane material with the siliceous material occurs in the absence of a polymerization catalyst, it is possible to speed up the rate of reaction, either by including a polymerization catalyst in the silane material-containing solution or by injecting a preflush of a slug of hydrocarbon carrier, containing a polymerization catalyst, prior to the injection of the silane material-containing solution. Suitable catalysts for polymerizing silane material are well known in the art and can be either acidic or alkaline materials. Examples of acidic catalysts include (1) organic or inorganic acids or acid-forming materials such as acetic acid, ethyl acetate, formic acid, ethyl formate, hydrochloric acid, sulfuric acid and hydroiodic acid, and (2) organic or inorganic bases or base-forming materials such as sodium hydroxide, butylamine, piperidine, phosphines and alkali metal amides. If catalyst is used, no more than about 50 percent by volume of catalyst, based on the volume of the injected solution, should be employed. In this instance the term "injected solution" is defined as a hydrocarbon carrier liquid preflush, a silane or a solution of a silane and a hydrocarbon carrier. Preferably, no more than about 10 percent by volume of catalyst, based on the volume of injected solution, should be employed.

Before injecting the silane material-containing solution, it is optional, but preferred, to backflow the formation, i.e., inject a slug of a preflush composition. The preflush dislodges any bridges of fines that might have been formed at pore throats during production of fluids from the formation. This increases the probability that subsequently-injected silane material will bind the fines in position, at a location in the formation other than at a pore throat, thus increasing the permeability of the formation compared to what it was before the treatment. The materials which can be used as a preflush are the same hydrocarbon carrier liquids described above, which are sometimes injected along with the silane material. As mentioned above, the preflush can also contain a catalyst for polymerizing silane material. The volume of preflush to be used is typically about 0.5 to 100 gallons per vertical foot of formation to be treated.

In selecting a preflush material, it is preferred to avoid a mutual solvent, i.e., a material, such as a lower alkyl alcohol, in which the silane, the hydrocarbon carrier liquid, and water each have at least some solubility. When a mutual solvent is injected into a water-containing formation as a preflush, the formation retains at least some of the resulting solution of water in the mutual solvent. If a solution of silane in a hydrocarbon carrier liquid is then injected into this formation, some of the solution of water in the mutual solvent dissolves in the solution of silane in the hydrocarbon carrier. As a result, water can contact the silane and hydrolyze the silane to form a polymer before the silane has adsorbed on the formation rock. This polymer does not adsorb on the formation and does not bind formation fines in place.

Similarly, following injection of the silane material-containing solution, it is optional, but preferred, to inject a slug of an afterflush or overflush material to displace the silane material-containing solution out of the wellbore and into the formation. The same hydrocarbon carrier liquids described above or any convenient aqueous or nonaqueous fluid, liquid or gaseous, can be used as the afterflush. The volume of liquid afterflush to be used is typically about 0.5 to 100 gallons per vertical foot of formation to be treated. While an aqueous displacement fluid can be used, it is preferred that no portion of the aqueous displacement fluid be injected into the silane-treated formation. Most hydrocarbon-producing formations contain sufficient connate water to hydrolyze the silane after the silane has adsorbed onto the formation rock and require no additional water for hydrolysis. If water is injected into a formation containing both a silane and liquid formation hydrocarbons or a hydrocarbon carrier liquid, there is danger that the injected water will contact and hydrolyze the silane at the water-hydrocarbon interface such that the hydrocarbon layer will be a barrier to reaction of the silanol and condensation products with the rock surface. Also, it is often desired that no water be injected into those formations which produce only oil and contain no water other than connate water.

The second treating solution injected into the formation is a slug of steam containing a compound which contains ammoniacal nitrogen, selected from the group consisting of ammonium hydroxide, ammonium salts of inorganic acids, ammonium salts of carboxylic acids, quaternary ammonium halides, amine or substituted amine hydrochlorides, derivatives of ammonium cyanate, and water-soluble ammonia or ammonium ion precursors selected from the group consisting of amides of carbamic acid and thiocarbamic acid, derivatives of such amides, tertiary acid amides and their substituted and alkylated derivatives.

Ammonium hydroxide, i.e., aqua ammonia, can be used in aqueous solutions of various strengths ranging up to solutions containing 30 percent by weight ammonia, the most concentrated solution generally commercially available.

Examples of suitable ammonium salts of inorganic acids include ammonium chloride, tetramethyl ammonium chloride, ammonium bromide, ammonium iodide, ammonium fluoride, ammonium bifluoride, ammonium cyanate, ammonium thiocyanate, ammonium fluoroborate, ammonium nitrate, ammonium nitrite, ammonium sulfate, ammonium sulfite, ammonium sulfamate, ammonium carbonate, ammonium bicarbonate, $NH_2COONH_4 \cdot NH_4HCO_3$, $(NH_4)_2CO_3 \cdot 2NH_4HCO_3$, ammonium borate, ammonium chromate and ammonium dichromate. Ammonium carbonate, also referred to as the double salt ammonium sesquicarbonate, and ammonium chloride are preferred.

Examples of suitable ammonium salts of a carboxylic acid include ammonium acetate, ammonium citrate, ammonium tartrate, ammonium formate, ammonium gallate and ammonium benzoate The quaternary ammonium compounds for use in this invention can be represented by the general formula:

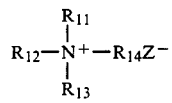

wherein at least one of the substituents $R_{11}$, $R_{12}$, $R_{13}$ and $R_{14}$ is an organic hydrophobic group having 1 to 20 carbon atoms. The other substituents are independently alkyl or hydroxyalkyl groups having 1 to 4 carbon atoms, benzyl groups, or alkoxy groups of the formula $(C_2H_4O)_nH$ or $(C_3H_6O)_nH$ where n is 2 to 10. The preferred cation in the quaternary cation is the quaternary ammonium compound. The anion, Z, preferably is chloride. This can be replaced by various other anions such as bromide, iodide or ethylsulfate ions. Exemplary of suitable quaternary ammonium compounds are tetramethyl ammonium chloride, dioctyl dimethyl ammonium chloride, dodecyl trimethyl ammonium chloride, cetyl trimethyl ammonium chloride, cetyl trimethyl ammonium bromide, dodecyl trimethyl benzyl ammonium chloride, ethyltrimethyl ammonium iodide, iodomethyltrimethyl ammonium iodide, tetraethyl ammonium iodide, tetramethyl ammonium hepta-iodide and methyl pyridinum chloride. Particularly good results have been obtained with tetramethyl ammonium chloride.

Also useful are amine or substituted amine hydrochlorides such as the mono-, di- and tri-alkyl amine hydrochlorides wherein the alkyl group contains 1 to 20 carbon atoms, straight chain or branched, aryl amine hydrochlorides, hydroxy-substituted amine hydrochlorides and heterocyclic-substituted amine hydrochlorides. Examples of suitable materials include methylamine hydrochloride, ethylamine hydrochloride, propylamine hydrochloride, butylamine hydrochloride, dodecylamine hydrochloride, eicosylamine hydrochloride, diethylamine hydrochloride, triethylamine hydrochloride, benzylamine hydrochloride, naphthylamine hydrochloride, hydroxylamine hydrochloride, 2-aminopyridine hydrochloride and 4-aminopyridine hydrochloride. Particularly good results have been obtained with butylamine hydrochloride.

Examples of derivatives of ammonium cyanate include cyanuric acid, urea cyanurate and ammelide.

The ammonium ion precursors suitable for use in this invention are water-soluble materials which hydrolyze in the presence of steam to form ammonia and/or ammonium ions.

One group of ammonium ion precursors are the amides of carbamic acid and thiocarbamic acid, including urea, biuret, triuret, thiourea and ammonium carbamate. Urea is one of the most preferred additives for use in the present invention.

Another group of ammonium ion precursors are derivatives of carbamic acid and thiocarbamic acids including monomethylolurea and dimethylolurea.

Still another group of ammonium ion precursors are tertiary carboxylic acid amides and their substituted and alkylated amide couterparts characterized by the formula:

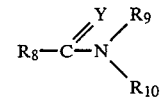

wherein (1) $R_8$ is hydrogen or an organic radical, particularly an alkyl group containing 1 to about 8 carbon atoms, or an $\alpha$-hydroxy substituted alkyl group containing 1 to about 8 carbon atoms, (2) $R_9$ and $R_{10}$ are independently selected from hydrogen and organic radicals, with alkyl groups containing 1 to about 8 carbon atoms being preferred organic radicals, and (3) Y is oxygen or sulfur. Preferred tertiary carboxylic acid amides and their substituted and alkylated amine counter-parts include formamide, acetamide, N,N-dimethylformamide, N,N-diethylformamide, N,N-dimethylacetamide, N,N-diethylacetamide, N,N-dipropylacetamide, N,N-dimethylpropionamide and N,N-diethylpropionamide.

Other species which may be used include N-methyl,N-ethylacetamide, N-methyl,N-octylpropionamide, N-methyl,N-hexyl-n-butyramide, N-methyl,N-propylcaproamide, N,N-diethylcaprylamide and the like. N,N-dimethylformamide is an especially preferred tertiary carboxylic acid amide.

The compound containing ammoniacal nitrogen should be employed in an amount which is effective in stabilizing fines. This amount will vary depending especially on the nature and amount of fines present in the particular formation being treated and the particular additive used. Typically, there is used about 0.1 to 25 percent by weight of compound containing ammoniacal nitrogen, preferably 0.5 to 5 percent by weight, based on the weight of the boiler feedwater used to generate the steam.

Additives which are liquid at ambient temperatures can be added directly, either to the boiler feedwater or to the steam itself. If added to the steam, the addition can be made either at the surface, as the steam is being injected into the formation, or down a well penetrating the formation to be treated, or the additive can be injected downhole via a separate conduit and mixed with the steam downhole, prior to its entering the formation. Additives which are solids at ambient temperature can be added directly to the feedwater or a concentrated solution thereof can be prepared and then employed as described above for a liquid additive. An example of a suitable concentrated solution is a solution containing 35 to 50 percent by weight urea and 65 to 50 percent by weight water.

If one of the chief objectives in the application of this treatment to an enhanced oil recovery method is to use steam to mobilize oil which otherwise would be difficult to recover, the amount of steam to be used is well known in the art and is the same as for steam treatments in general. If mobilization of oil is of secondary importance, as in treating a surface formation or a water injection well completed in a fines-containing formation to stabilize the fines, it is recommended to use the steam generated from about 250 to 3,000 barrels of feedwater per vertical foot of formation to be treated. Preferably the steam should be injected at a rate of about 200 to 1500 barrels of feedwater per day per well.

While the reasons for the effect on the formation permeability of steam containing a compound which contains ammoniacal nitrogen are not completely understood, and the invention is not to be held to any particular theory of operation, it is believed that the success of this method may be due to one or more of the following two reasons: (1) The ammonia or ammonium ions add to the total dissolved solids content both of the water component of the steam, if wet steam is employed, and of the water condensing from the steam itself. These solids appear to decrease the swelling tendency of the clays when exposed to water, even when such exposure is subsequent to the carrying out of this method. (2) Some non-clay fines treated with steam alone appear to react hydrothermally to produce water-swellable clays which then reduce permeability. The presence of the ammonia or ammonium ions in the steam inhibits this clay-forming reaction. The ammonia or ammonium ion may react with water-swellable clays to transform them into materials which have less tendency to swell in water.

The method of this invention can be employed to treat or condition fines-containing earthen formations which are exposed at the surface, located just below the surface, or which are located a substantial distance below the surface and are penetrated by a well. In one manner of treating subterranean formations penetrated by a well, the treatment can involve an enhanced oil recovery method wherein steam is injected into the formation to mobilize oil, and the method of this invention prevents formation damage by the steam. In another instance the treatment can involve stimulation of a well penetrating a formation whose permeability has been impaired previously. Such impairment can occur in various ways depending on the previous history of the well, for example, wells drilled with water-base drilling fluid and/or whose surrounding formations have been exposed to water. As used herein the term "stimulation" can include both improving the fluid flow rate through a formation and removing formation damage therefrom.

The invention is further illustrated by the following examples which are illustrative of various aspects of the invention and are not intended as limiting the scope of the invention as defined by the appended claims.

EXAMPLE 1

A first laboratory test is carried out utilizing only one step of the two step process of this invention, i.e., steam containing a compound which contains ammoniacal nitrogen is employed but no treatment with an organosilicon compound is carried out. A, first synthetic core is prepared by packing a 1-inch diameter 3-inch long tube with loose sand from the Sespe formation of California. The Sespe formation contains about 9 percent by weight clays and about 10 to 25 percent by weight silt. The synthetic core is treated as follows:

(a) A 3 percent by weight aqueous solution of sodium chloride is injected into the core at a pressure of 15 pounds per square inch (psi) for 2 hours. The final flow rate stabilizes at 1.2 milliliters per minute (ml./min.). The permeability is calculated as 31.0 millidarcys (mds.) and taken as the "original permeability" of the core.

(b) Distilled water is injected into the core at 15 psi for 1 hour. The final flow rate is 0.21 ml./min. This is 16 percent of the original permeability.

(c) Steam containing 2 grams per liter ammonium carbonate (based on the amount of boiler feedwater used) is injected into the core at 500° F. and 700 psi for 8 hours.

(d) A 3 percent by weight aqueous solution of sodium chloride is injected into the core at a pressure of 15 psi for 2 hours. The final flow rate is 1.45 mls./min. This is 120 percent of the original permeability.

(e) Distilled water is injected into the core at 15 psi for 1 hour. The final flow rate is 0.18 ml./min. This is 15 percent of the original permeability.

EXAMPLE 2

A second laboratory test is carried out utilizing both steps of the process of this invention, i.e., there is injected into a core an organosilicon compound followed by steam containing a compound which contains ammoniacal nitrogen. A second synthetic core is prepared by packing a 1 inch diamcter 3 inch long tube with loose sand from the Sespe formation of California. The core is then treated as follows:

(a) 100 ml. of super high flash naphtha is injected into the core at a flow rate of 2 ml./min. and 100° F. as a preflush, (b) 100 ml. of a solution containing 3 percent by volume ν-aminopropyl triethoxysilane, 2 percent by volume butyl amine polymerization catalyst and 95 percent by volume super high flash naphtha carrier liquid is injected into the core at a flow rate of 100 ml./min. at 100° F.

(c) 50 ml. of super high flash naphtha is injected into the core at a flow rate of 2 ml./min. at 100° F. as an overflush.

(d) After cooling the core to room temperature, a 3 percent by weight aqueous solution of sodium chloride is injected into the core at a pressure of 15 psi for 2 hours. The final flow rate is 0.54 ml./min. The permeability is calculated as 16.7 mds and taken as the "original permeability" of the core.

(e) Distilled water is injected into the core at 15 psi for 1 hour. The final flow rate is 0.45 ml./min. This is 84 percent of the original permeability.

(f) Steam containing 2 grams per liter ammonium carbonate (based on the amount of boiler feedWater used) is injected into the core at 500° F. and 700 psi for 6 hours.

(g) A 3 percent by weight aqueous solution of sodium chloride is injected into the core at a pressure of 15 psi for 2 hours. The final flow rate is 0.55 ml./min. This is 105 percent of the original permeability.

(h) Distilled water is injected into the core at 15 psi for 1 hour. The first flow rate is 0.54 ml./min. This is 95 percent of the original permeability.

A comparison of Examples 1 and 2 shows that: (1) in Example 1 where a core is treated only with steam containing ammonium carbonate, the permeability to an aqueous solution of sodium chloride is high, but the permeability to distilled water is relatively quite low; and (2) in Example 2 where the core is treated with ν-aminopropyltriethoxysilane prior to being treated with steam containing ammonium carbonate, the permeability to an aqueous solution of sodium chloride is high, and the permeability remains relatively high when the core is exposed to distilled water. Thus, distilled water does negligible damage to the permeability of a core treated according to the process of this invention.

EXAMPLE 3

Wells in the Sespe formation in California have a history of production declines thought to be due to movement of fines in the formation. These wells typically do not respond particularly favorably to stimulation by steam injection. One particular well is used as a vent well in a fireflood operation, i.e., is at a point higher in the geologic structure than the injection well, and both removes combustion gases from the formation and produces some oil. Production averages 3 barrels oil per day and 5 barrels per day gross production. A core from the formation is examined in the laboratory and found to be quite sensitive to damage by movement of non-clay fines. There is also a problem due to clay dispersion. Some fines are produced along with well fluids including iron compounds, quartz grains, feldspars and other aluminosilicates.

The well is first given a treatment to bind the formation fines in place. First, there are injected 4,000 gallons of super high-flash naphtha solvent as a preflush. Next, there are injected 4,000 gallons of a solution containing 95 percent by volume of super high-flash naphtha as a carrier liquid, 3 percent by volume of ν-aminopropyl triethoxysilane and 2 percent by volume of ethyl formate polymerization catalyst. Finally, there is injected a two-stage overflush, the first stage being 3,000 gallons of super high-flash naphtha and the second stage being 1,600 gallons of an aqueous solution containing 6 percent by weight potassium chloride. Injection is carried out for about 9 hours at rates varying between 0.5 and 1.0 barrels per minute at a wellhead pressure of 600 to 800 psig. Fracturing pressure is never exceeded and there is no loss or reduction of injectivity during the treatment.

Two days later a steam injection treatment of the well is started. A concentrated solution of urea in water is added to steam generator feedwater to achieve a urea concentration of 2.0 percent by weight in the feedwater. Initial stable conditions were 500 barrels/day feed water injection rate, 60 percent quality steam at 580° F. and 1,200 psi generator conditions. The second day of steam injection, the concentration of urea in the feedwater is lowered to 1 percent. The third day, and for the remainder of a one month steam injection period, the concentration of urea is lowered to 0.5 percent. In total, the well is given an injection of 4 billion BTU steam slug followed by a two week shut in soaking period.

The well is then placed on production. It flows for 14 days before being returned to rod pump production. While flowing, the well produces 210 to 240 barrels water per day for about one week before oil production begins. During the second week of flowing production, the gross volume of fluids produced is maintained while estimates of oil production included ranges from 2 to 32 barrels oil per day. The well is then converted to rod pump production after being killed with an aqueous solution containing 3 percent by weight potassium chloride. During circulation to kill the well, about 50 barrels of oil are recovered from the annulus. The initial production by pump is about 175 barrels water per day. After the kill fluid is recovered and after the annulus has filled with oil, the well begins producing 22 to 37 barrels oil per day while maintaining gross production at about 175 barrels per day. During the following week production averages 30 barrels oil per day and 167 barrels per day gross production. During the following three weeks production stabilizes at 70 to 74 barrels oil per day and 175 barrels per day gross production. A total of more than 16,000 incremental barrels of oil are produced from the well during the 8 month and 1 week period following treatment.

Solids content of the produced fluids is periodically monitored following the steam stimulation treatment. Solids production remains negligible.

While various specific embodiments and modifications of this invention have been described in the foregoing specifications, further modifications will be apparent to those skilled in the art. Such further modifications are included within the scope of this invention as defined by the following claims.

We claim:

1. A method for treating a fines-containing earthen formation, including both surface and subsurface strata, comprising:
  (a) injecting into the formation an organosilicon compound selected from the group consisting of organosilane halides, organosilane hydrides, organosilane alkoxides, and organosilane amines, in which an organosilane halide, hydride, or amine has the formula:

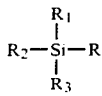

wherein R is a halogen, hydrogen, or an amine radical which can be substituted with hydrogen, organic radicals, or silyl groups, $R_1$ is hydrogen, an amine, or an organic radical having from 1 to 50 carbon atoms, and $R_2$ and $R_3$ are hydrogen or the same or different halogens, amines, or organic radicals having from 1 to 50 carbon atoms, and in which an organosilane alkoxide has the formula:

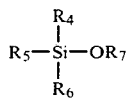

wherein $R_4$, $R_5$ and $R_6$ are independently selected from hydrogen, amine, halogen, alkoxide, and organic radicals having from 1 to 50 carbon atoms and $R_7$ is an organic radical having from 1 to 50 carbon atoms; and (b) subsequently, injecting steam containing a compound which contains ammoniacal nitrogen, selected from the group consisting of ammonium hydroxide, ammonium salts of inorganic acids, ammonium salts of carboxylic acids, quaternary ammonium halides, amine or substituted amine hydrochlorides, derivatives of ammonium cyanate, and water-soluble ammonia or ammonium ion precursors selected from the group consisting of amides of carbamic acid and thiocarbamic acid, derivatives of such amides, tertiary carboxylic acid amides and their substituted and alkylated derivatives characterized by the formula:

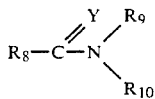

wherein (1) $R_8$ is hydrogen or an organic radical, (2) $R_9$ and $R_{10}$ are independently selected from hydrogen and organic radicals, and (3) Y is oxygen or sulfur.

2. The method defined in claim 1 wherein the organosilicon compound is injected in an amount sufficient to coat a substantial portion of the formation fines.

3. The method defined in claim 1 wherein the amount of organosilicon compound employed is about 0.5 to 100 gallons per vertical foot of formation to be treated.

4. The method defined in claim 1 wherein R is a halogen, $R_1$ is an alkyl, alkenyl or aryl group having from 1 to 18 carbon atoms, $R_2$ and $R_3$ are the same or different halogens, or alkyl, alkenyl or aryl groups having from 1 to 18 carbon atoms, $R_4$, $R_5$ and $R_6$ are independently selected from hydrogen, amine, alkyl, alkenyl, aryl and carbohydroxyl groups having from 1 to 18 carbon atoms, and $R_7$ is selected from an amine, alkyl, alkenyl and aryl group having from 1 to 18 carbon atoms.

5. The method defined in claim 1 wherein the organosilicon compound is injected as a solution, up to about 50 percent by volume, in a hydrocarbon carrier liquid selected from the group consisting of crude oils, aliphatic hydrocarbons, aromatic hydrocarbons and petroleum distillation products.

6. The method defined in claim 1 wherein there is included in the organosilicon compound injected up to about 50 percent by volume of a polymerization catalyst.

7. The method defined in claim 1 wherein there is injected into the formation before the organosilicon compound about 0.5 to 100 gallons per vertical foot of formation to be treated of a preflush of a hydrocarbon liquid.

8. The method defined in claim 1 wherein there is injected into the formation before the organosilicon compound about 0.5 to 100 gallons per vertical foot of formation to be treated of a preflush of a hydrocarbon liquid containing up to about 50 percent by volume of a polymerization catalyst.

9. The method defined in claim 1 wherein there is injected into the formation following the organosilocon compound about 0.5 to 100 gallons per vertical foot of formation to be treated of an afterflush of a hydrocarbon liquid.

10. The method defined in claim 1 wherein the organosilane alkoxide is an alkylated amine substituted organosilane alkoxide.

11. The method defined in claim 1 wherein the organosilane alkoxide is $v$-aminopropyltriethoxysilane.

12. The method defined in claim 1 wherein the amount of the compound containing ammoniacal nitrogen is about 0.1 to 25 percent by weight based on the weight of boiler feedwater used to generate the steam.

13. The method defined in claim 1 wherein the amount of the compound containing ammoniacal nitrogen is about 0.5 to 5 percent by weight based on the weight of boiler feedwater used to generate the steam.

14. The method defined in claim 1 wherein the compound containing ammoniacal nitrogen is added to the boiler feedwater used to generate the steam.

15. The method defined in claim 1 wherein the compound containing ammoniacal nitrogen is added to the steam.

16. The method defined in claim 1 wherein the earthen formation is a subsurface stratum penetrated by a well and the compound containing ammoniacal nitrogen is added to the steam at the surface of the well.

17. The method defined in claim 1 wherein the earthen formation is a subsurface stratum penetrated by a well and the compound containing ammoniacal nitrogen is added to the steam downhole before the steam enters the subsurface stratum.

18. The method defined in claim 1 wherein the fines include water-swellable clays.

19. The method defined in claim 1 wherein the compound containing ammoniacal nitrogen is an ammonium salt of an inorganic acid selected from the group consisting of ammonium chloride, tetramethyl ammonium chloride, ammonium bromide, ammonium iodide, ammonium fluoride, ammonium bifluoride, ammonium fluoroborate, ammonium nitrate, ammonium nitrite, ammonium sulfate, ammonium sulfite, ammonium sulfamate, ammonium carbonate, ammonium bicarbonate, $NH_2COONH_4.NH_4HCO_3$, $(NH_4)_2CO_3.2NH_4HCO_3$, ammonium borate, ammonium cyanate, ammonium thiocyanate, ammonium chromate and ammonium dichromate.

20. The method of claim 1 wherein the compound containing ammoniacal nitrogen is ammonium carbonate.

21. The method defined in claim 1 wherein the compound containing ammoniacal nitrogen is an ammonium salt of a carboxylic acid selected from the group consisting of ammonium acetate, ammonium citrate, ammonium tartrate, ammonium formate, ammonium gallate and ammonium benzoate.

22. The method defined in claim 1 wherein the compound containing ammoniacal nitrogen is a derivative of ammonium cyanate selected from the group consisting of cyanuric acid, urea cyanurate and ammelide.

23. The method defined in claim 1 wherein the compound containing ammoniacal nitrogen is an amide of carbamic acid selected from the group consisting of urea, biuret, triuret and ammonium carbamate.

24. The method defined in claim 1 wherein the compound containing ammoniacal nitrogen is urea.

25. The method defined in claim 1 wherein the compound containing ammoniacal nitrogen is thiourea.

26. The method defined in claim 1 wherein the compound containing ammoniacal nitrogen is a derivative of carbamic acid selected from the group consisting of monomethylolurea and dimethylolurea.

27. The method defined in claim 1 wherein the compound containing ammoniacal nitrogen is a tertiary carboxylic acid amide, substituted tertiary carboxylic acid amide, or derivative of a tertiary carboxylic acid selected from the group consisting of formamide, acetamide, N,N-dimethylformamide, N,N-diethylformamide, N,N-dimethylacetamide, N,N-diethylacetamide, N,N-dipropylacetamide, N,N-dimethylpropionamide and N,N-diethylpropionamide.

28. The method defined in claim 1 wherein the compound containing ammoniacal nitrogen is selected from the group consisting of ammonium chloride, ammonium bromide, ammonium fluoride, ammonium bifluoride and ammonium iodide.

29. The method defined in claim 1 wherein the compound containing ammoniacal nitrogen is a quaternary ammonium compound having the formula:

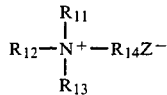

wherein at least one of the substituents $R_{11}$, $R_{12}$, $R_{13}$ and $R_{14}$ is an organic hydrophobic group having 1 to 20 carbon atoms, and the other substituents are independently alkyl or hydroxyalkyl groups having 1 to 4 carbon atoms, benzyl groups, or alkoxy groups of the formula $(C_2H_4O)_nH$ or $(C_3H_6O)_nH$ where n is 2 to 10 and Z is the chloride ion.

30. The method defined in claim 1 wherein the compound containing ammoniacal nitrogen is an amine or substituted amine hydrochloride selected from the group consisting of mono-, di- and tri-alkyl amine hydrochlorides wherein the alkyl group contains 1 to 20 carbon atoms, straight chain or branched aryl amine hydrochlorides, hydroxy-substituted amine hydrochlorides and heterocyclic-substituted amine hydrochlorides.

31. The method defined in claim 1 wherein the organic radical which comprises $R_8$ is an alkyl group containing 1 to about 8 carbon atoms or an α-hydroxy substituted alkyl group containing 1 to about 8 carbon atoms.

32. The method defined in claim 1 wherein the organic radicals which comprise $R_1$ and $R_2$ are the same or different alkyl groups containing 1 to about 8 carbon atoms.

33. The method defined in claim 1 wherein the permeability of the earthen formation is increased by at least 50 percent, based on the permeability prior to the carrying out the method.

34. The method defined in claim 1 wherein the permeability of the earthen formation is increased by at least 150 percent, based on the permeability prior to the carrying out the method.

35. The method defined in claim 1 wherein there is first injected an alkylated amine substituted organosilane alkoxide, and wherein steam contains a compound selected from the group consisting of urea and an ammonium salt of an inorganic acid.

36. The method defined in claim 35 wherein the organosilane alkoxide is injected as a solution in a hydrocarbon carrier liquid, selected from the group consisting of crude oil, aliphatic hydrocarbons, aromatic hydrocarbons, and petroleum distillation products, which solution further contains a polymerization catalyst.

37. The method defined in claim 36 wherein the solution is injected in an amount about 0.5 to 100 gallons per vertical foot of formation to be treated.

38. A method for treating subterranean formations which contain formation fines to minimize impairment of formation permeability due to the presence of the formation fines comprising:
(a) injecting into the formation about 0.5 to 100 gallons per vertical foot of formation to be treated of:
(i) an organosilane halide having the formula:

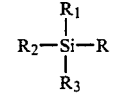

wherein R is a halogen, $R_1$ is an alkyl, alkenyl or aryl group having from 1 to 18 carbon atoms and $R_2$ and $R_3$ are the same or different halogens, or alkyl, alkenyl or aryl groups having from 1 to 18 carbon atoms; or (ii) an organosilane alkoxide having the formula:

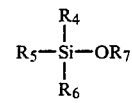

wherein $R_4$, $R_5$ and $R_6$ are independently selected from hydrogen, amine, alkyl, alkenyl, aryl and carbohydroxyl groups having from 1 to 18 carbon atoms, and $R_7$ is selected from an amine, alkyl, alkenyl and aryl group having from 1 to 18 carbon atoms; and (b) subsequently, injecting steam generated from about 250 to 3,000 barrels of feedwater per vertical foot of formation to be treated, said steam containing about 0.1 to 25 percent by weight, based on the weight of boiler feedwater used to generate the steam, of a compound containing ammoniacal nitrogen, selected from the group consisting of ammonium hydroxide, ammonium salts of inorganic acids, ammonium salts of carboxylic acids, quaternary ammonium halides, amine or substituted fine hydrochlorides, derivatives of ammonium cyanate, and water-soluble ammonia or ammonium ion precursors selected from the group consisting of amides of carbamic acid and thiocarbamic acid, derivatives of such amides, tertiary carboxylic acid amides and their substituted and alkylated derivatives characterized by the formula:

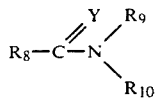

wherein (1) $R_8$ is hydrogen, an alkyl group containing 1 to about 8 carbon atoms, or an X-hydroxy substituted alkyl group containing 1 to about 8 carbon atoms, (2) $R_9$ and $R_{10}$ are independently selected from hydrogen and alkyl groups containing 1 to about 8 carbon atoms, and (3) Y is oxygen or sulfur.

39. The method defined in claim 38 wherein the organosilane halide or organosilane alkoxide is injected as a solution, up to about 50 percent by volume, in a hydrocarbon carrier liquid selected from the group consisting of crude oil, aliphatic hydrocarbons, aromatic hydrocarbons and petroleum distillation products.

40. The method defined in claim 38 wherein there is included in the organosilane halide or organosilane alkoxide injected up to about 50 percent by volume of a polymerization catalyst, selected from the group consisting of organic acids or bases, inorganic acids or bases, and acid or base-forming materials.

41. The method defined in claim 38 wherein the organosilane alkoxide is an alkylated amine substituted organosilane alkoxide.

42. The method defined in claim 41 wherein the organosilane alkoxide is ν-aminopropyltriethoxysilane.

43. The method defined in claim 38 wherein the compound which contains ammoniacal nitrogen is added to the boiler feedwater used to generate the steam.

44. The method defined in claim 38 wherein the compound which contains ammoniacal nitrogen is added to the steam.

45. The material defined in claim 38 wherein the compound which contains ammoniacal nitrogen is ammonium carbonate.

46. The method defined in claim 38 wherein the compound which contains ammoniacal nitrogen is urea.

47. A method for treating an earthen formation including both surface and subsurface strata to stimulate the flow of fluids through the formation comprising:
  (a) injecting into the formation 0.5 to 100 gallons per vertical foot of formation to be treated of an alkylated amine substituted organosilane alkoxide, as a solution, up to about 50 percent by volume, in a hydrocarbon carrier liquid selected from the group consisting of crude oils, aliphatic hydrocarbons, aromatic hydrocarbons and petroleum distillation products, which solution further contains a polymerization catalyst; and
  (b) subsequently, injecting steam generated from about 250 to 3,000 barrels of feedwater per vertical foot of formation to be treated, said steam containing about 0.1 to 25 percent by weight, based on the weight of boiler feedwater used to generate the steam, of a compound which contains ammoniacal nitrogen, selected from the group consisting of ammonium salts of inorganic acids and amides of carbamic acid.

48. The method defined in claim 47 wherein the alkylated amine substituted organosilane alkoxide is ν-aminopropyltriethoxysilane.

49. The method defined in claim 47 wherein the ammonium salt of an inorganic acid is ammonium carbonate.

50. The method defined in claim 47 wherein the amide of carbamic acid is urea.

51. In a method for enhanced oil recovery from a subterranean formation penetrated by a well wherein steam is injected into the formation, the improvement which comprises:
  (a) injecting into the formation 0.5 to 100 gallons per vertical foot of formation to be treated of an alkylated amine substituted organosilane alkoxide as a solution, up to about 50 percent by volume, in a hydrocarbon carrier liquid selected from the group consisting of crude oils, aliphatic hydrocarbons, aromatic hydrocarbons and petroleum distillation products, which solution further contains a polymerization catalyst; and
  (b) subsequently, injecting steam generated from about 250 to 3,000 barrels of feedwater per vertical foot of formation to be treated, said steam containing about 0.1 to 25 percent by weight, based on the weight of boiler feedwater used to generate the steam, of a compound containing ammoniacal nitrogen, selected from the group consisting of ammonium salts of inorganic acid and amides of carbamic acid.

52. The method defined in claim 51 wherein the alkylated amine substituted organosilane alkoxide is ν-aminopropyltriethoxysilane.

53. The method defined in claim 51 wherein the ammonium salt of an inorganic acid is ammonium carbonate.

54. The method defined in claim 51 wherein the amide of carbamic acid is urea.

* * * * *